Dec. 24, 1957 H. N. BEVERIDGE 2,817,762

RELAXATION OSCILLATORS

Filed June 29, 1955

INVENTOR
HAROLD N. BEVERIDGE
BY Elmer J. Gorn
ATTORNEY

United States Patent Office 2,817,762

Patented Dec. 24, 1957

2,817,762

RELAXATION OSCILLATORS

Harold N. Beveridge, Kenilworth, Ill., assignor to Raytheon Manufacturing Company, Waltham, Mass., a corporation of Delaware Application June 29, 1955, Serial No. 518,743

4 Claims. (Cl. 250—36)

This invention relates to a modulation trigger circuit commonly known as a relaxation oscillator, and more particularly to a thyratron modulator circuit that serves the dual purpose of supplying a trigger output pulse and determining the pulse repetition frequency of said output pulse.

This invention discloses a relaxation oscillator circuit comprising an electron discharge device consisting of a plurality of electrodes, including a cathode, an anode and a grid, located in a gaseous envelope, such as a thyratron tube. A capacitor is connected to said cathode, said anode is directly connected to a positive terminal of a potential source, and said grid is connected to a negative terminal of said potential source for maintaining a fixed potential difference between said grid and said anode. A charging circuit is provided for charging said capacitor through said electron discharge device for producing the output pulse of said oscillator. A discharge circuit is provided for discharging said capacitor through a circuit different from said charging circuit, thereby producing the pulse repetition frequency of said oscillator. Since the output pulse is usually short in time relationship to the repetition frequency of said pulses, the time constant of the charging circuit of said capacitor is very short in relationship to the time constant of the discharging circuit for said capacitor.

In previous systems it has been the practice to use an RC-type sine wave oscillator to generate the repetition frequency, after which the resulting sine wave was squared and then differentiated in order to trigger a small thyratron. The output of the small thyratron was then used to trigger a larger thyratron, necessitating the use of two extra tubes, one for determining the repetition frequency, and one for initiating the trigger pulse. This procedure was necessary due to the inherent instability of prior relaxation oscillator circuits. In the disclosed circuit, there is a fixed potential difference between the anode and the grid and it is this fixed potential difference that improves the stability of the relaxation oscillator circuit, thereby allowing it to be used in a modulation trigger circuit. This invention discloses how a single small thyratron can be used not only to supply the repetition frequency, but also to supply trigger output pulses.

Further objects and advantages of this invention will be apparent as the description progresses, reference being made to the accompanying drawing wherein.

Figure 1:
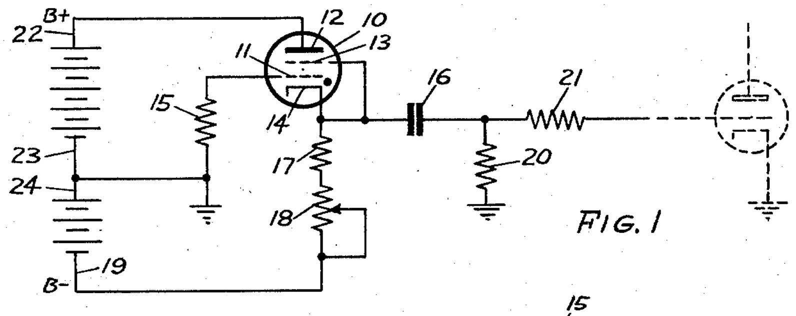
Fig. 1 is a circuit diagram of a relaxation oscillator constructed in accordance with the principles of this invention for producing a sharp triggering output pulse.

Referring now to Fig. 1, the relaxation oscillator modulator consists of a thyratron 10 having a controlled grid

11, anode 12, shield 13, and cathode 14. A resistor 15 is connected to the control grid 11 on one side and to ground on the other side. Cathode 14 is connected to a junction of shield grid 13, capacitor 16, and resistor 17. The other side of resistor 17 is connected to a variable resistor 18, which, in turn, is connected to a source of B— voltage 19. The other side of capacitor 16 is connected to a junction of resistor 20 which, in turn, is connected to ground, and resistor 21, the other side of which is connected to the grid of the large thyratron to be fired. Anode 12 is connected to a source of B+ voltage 22. The other side of the B+ voltage 22, which is negative potential 23, is connected to a junction of the other side of B— voltage 19, which is positive potential 24, which, in turn, is connected to ground. Potential points 23 and 24 connected together and also connected to ground are therefore at ground potential.

Figure 2:
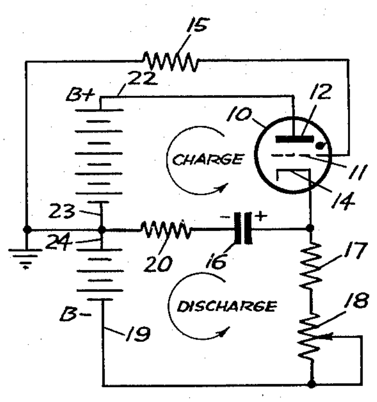
Fig. 2 is a simplified circuit diagram of Fig. 1 illustrating the separate charging and discharging circuits of said capacitor.
Figure 3:
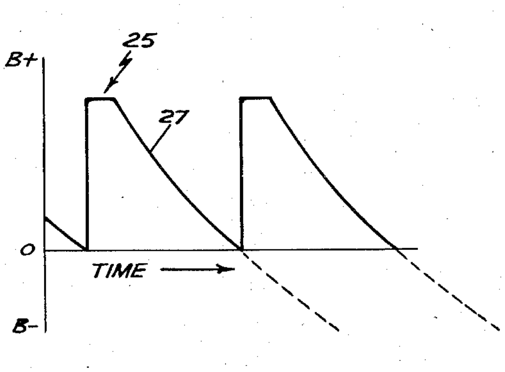
Fig. 3 is a waveform of the voltage appearing across B— terminal and the cathode illustrated in Fig. 1.
Figure 4:
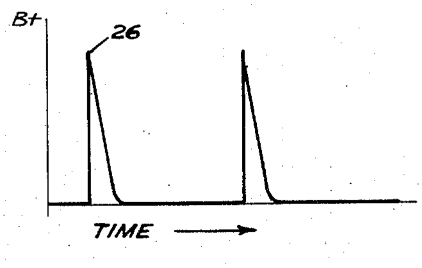
Fig. 4 is a waveform of the output triggering pulse.

The operation of the circuit defined in Fig. 1 is best understood by referring to Figs. 2, 3 and 4. Fig. 2 represents a simplified version of Fig. 1 redrawn in such a way as to illustrate the separate charging and discharging paths for capacitor 16.

An initial operating point for Fig. 2 can be visualized by assuming the circuit as illustrated, but without the thyratron tube 10 in place. In such a condition there will be a positive voltage difference between the pin representing the cathode and the pin representing the anode with a corresponding zero voltage on the pin representing the control grid. If it is now assumed that thyratron tube 10 is immediately placed in the circuit, the condition for firing said thyratron tube being present will cause the firing of thyratron 10, causing the gas contained therein to ionize, thereby allowing the voltage difference between cathode 14 and anode 12 to diminish. Stated in other words, the voltage on cathode 14 will tend to approach the voltage on anode 12, as illustrated by waveform 25 in Fig. 3. The value of resistor 20 is very small compared to the combined values of resistances 17 and 18 so that, when tube 10 fires, capacitor 16 will charge through the circuit consisting of cathode 14, anode 12, B+ supply voltage 22, negative potential 23, and through resistor 20 to capacitor 16. The resistance of the aforementioned charging circuit will be determined by resistor 20, and, since it was previously noted that resistor 20 is extremely small, capacitor 16 will charge very rapidly, causing a sharp voltage spike, as illustrated by waveform 26 in Fig. 4, to appear across resistor 20.

It is well known by referring to the appropriate curves for thyratrons that with a fixed potential appearing across the grid and the cathode that the firing point for any particular thyratron can vary over a very wide range of anode voltage. This particular situation would therefore cause a different pulse repetition frequency for any particular thyratron that would be placed in previously designed relaxation oscillator circuits. In this invention the voltage appearing across the anode 12 and grid 11 is fixed by the voltage appearing across B+ terminal 22 and negative terminal 23 and by the fact that anode 12 is directly coupled to B+ terminal 22. It can be seen, therefore, that, since anode 12 is directly tied to a fixed source of potential, it is the voltage on cathode 14 which is free to move. The curves for the thyratrons show that, for a fixed anode potential, the firing points will vary over a range of voltages from approximately 2 to 10 volts. When compared to the total anode voltage of usually 100 to 700 volts, it can be seen that the frequency stability of the relaxation oscillator, when constructed according to the principles of this invention, has been improved by a factor that is sometimes better than 100 to 1.

As mentioned previously, capacitor 16 will charge until the voltage between anode 12 and cathode 14 is insufficient to maintain ionization of the tube 10, which, in turn, will cause tube 10 to deionize, thereby opening the circuit between cathode 14 and anode 12. Capacitor 16 will now discharge through the discharging circuit consisting of resistor 20, positive potential 24, B— voltage 19, variable resistor 18, resistor 17, and capacitor 16 back to resistor 20. The wave form 27 of Fig. 3 illustrates the voltage on cathode 14 after tube 10 has deionized and capacitor 16 is discharging to the aforementioned discharging circuit. The slope of the discharging path is determined by the voltage appearing between positive terminal 24 and B— terminal 19. The function of the voltage appearing between positive terminal 24 and B— terminal 19 is to cause the slope of wave form 27 to straighten along that portion of the discharge path before capacitor 16 has reduced its voltage to a value which will cause tube 10 to fire. It can be seen, therefore, that a sufficiently high voltage will substantially improve the stability of the oscillatory circuit, which is essentially a discharge circuit. This voltage causes the discharging current to cross the reference level at which tube 10 fires during the straight portion of the discharge path at a point that can be specifically defined and predicted. Capacitor 16, which is holding cathode 14 at a positive potential, will discharge through the aforementioned discharge circuit until the voltage appearing across anode 12 and cathode 14 is sufficient to enable tube 10 to ionize, at which time tube 10 will again fire, repeating the same sequence of events. The voltage appearing between grid 11 and anode 12 is fixed but the voltage appearing across grid 11 of cathode 14 is free to move. Since the voltage on anode 12 is fixed, and since the changing voltage between grid 11 and cathode 14 is small compared to the total B+ voltage, it can now be seen how the frequency stability of the relaxation oscillator circuit is improved. Since variable resistor 18 is part of the discharge path of capacitor 16, it is obvious that changing the resistance or time constant of the discharge path will change the repetition frequency of the relaxation oscillator. Since the charging circuit of capacitor 16 is extremely short in comparison to the discharge circuit, it can now be seen how the charging of capacitor 16 produces the sharp triggering output pulse 26 illustrated in Fig. 4 for firing the large thyratron modulator and how large resistors 17 and 18 not only substantially prevent any current in the discharge circuit from effecting the charging circuit of capacitor 16 but also limit the magnitude of the discharge current.

This completes the description of the embodiments of the invention disclosed herein. However, many modifications and advantages thereof will be apparent to persons skilled in the art without departing from the spirit and scope of this invention. Accordingly, it is desired that this invention not be limited to the particular details of the embodiment as disclosed herein, except as defined by the appended claims.

What is claimed is:

1. A relaxation oscillator circuit comprising an electron discharge device consisting of a plurality of electrodes including a cathode, an anode, and a grid located in a gaseous envelope, said anode connected directly to a positive terminal of a first potential source, said grid connected to a negative terminal of said first potential source, a capacitor connected to said cathode at one end and to said negative terminal of said potential source at the other end, the circuit including said electron discharge device being termed a charging circuit, means in said charging circuit for generating an output pulse, and a second source of potential having a positive and negative terminal, said negative terminal connected to said cathode and said positive terminal connected to said negative terminal of said first potential source for providing a discharging circuit for said capacitor, whereby said discharging circuit determines the pulse repetition frequency of said output pulse and said electron discharge device is controlled by the total voltage of said first and second sources of potential.

2. A relaxation oscillator circuit comprising an electron discharge device consisting of a plurality of electrodes including a cathode, an anode, and a grid located in a gaseous envelope, said anode connected directly to a positive terminal of a first potential source, said grid connected to a negative terminal of said first potential source, a capacitor connected to said cathode at one end and to said negative terminal of said potential source at the other end, the circuit including said electron discharge device being termed a charging circuit, means in said charging circuit for generating an output pulse, and a second source of potential having a positive and negative terminal which potential is substantially greater than said first source of potential, said negative terminal connected to said cathode and said positive terminal connected to said negative terminal of said first potential source for providing a discharging circuit for said capacitor, whereby said discharging circuit determines the pulse repetition frequency of said output pulse and said electron discharge device is controlled by the total voltage of said first and second sources of potential.

3. A relaxation oscillator circuit comprising a thyratron consisting of a plurality of electrodes including a cathode, and anode, and a grid located in a gaseous envelope, said anode connected directly to a positive terminal of a first potential source, said grid connected to a negative terminal of said first potential source, a capacitor connected to said cathode at one end and to said negative terminal of said potential source at the other end, the circuit including said thyratron being termed a charging circuit, means in said charging circuit for generating an output pulse, and a second source of potential having a positive and negative terminal, said negative terminal connected to said cathode and said positive terminal connected to said negative terminal of said first potential source for providing a discharging circuit for said capacitor, whereby said discharging circuit determines the pulse repetition frequency of said output pulse and said thyratron is controlled by the total voltage of said first and second sources of potential.

4. A relaxation oscillator circuit comprising an electron discharge device consisting of a plurality of electrodes including a cathode, an anode, and a grid located in a gaseous envelope, said anode connected directly to a positive terminal of a first potential source, said grid connected to a negative terminal of said first potential source, a capacitor connected to said cathode at one end and to said negative terminal of said potential source at the other end, the circuit including said electron discharge device being termed a charging circuit, said charging circuit being of substantially low impedance, means in said charging circuit for generating an output pulse, and a second source of potential having a positive and negative terminal, said negative terminal connected to said cathode and said positive terminal connected to said negative terminal of said first potential source for providing a substantially high impedance discharging circuit for said capacitor, whereby said discharging circuit determines the pulse repetition frequency of said output pulse and said electron discharge device is controlled by the total voltage of said first and second sources of potential.

References Cited in the file of this patent

UNITED STATES PATENTS

| | | |
|---|---|---|
| 1,898,827 | Franklin et al. | Feb. 21, 1933 |
| 2,648,063 | Schmitt | Aug. 4, 1953 |
| 2,672,556 | Leighton | Mar. 16, 1954 |

FOREIGN PATENTS

| | | |
|---|---|---|
| 488,842 | Great Britain | July 14, 1938 |